UNITED STATES PATENT OFFICE.

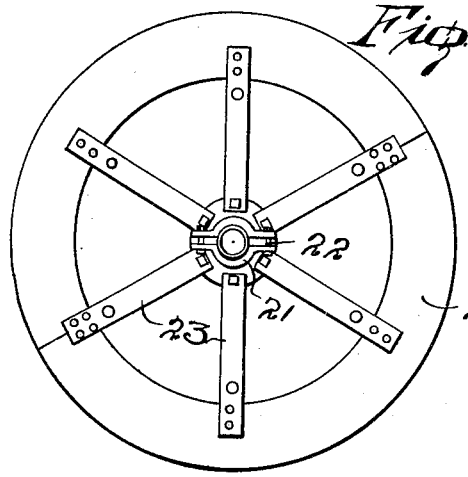
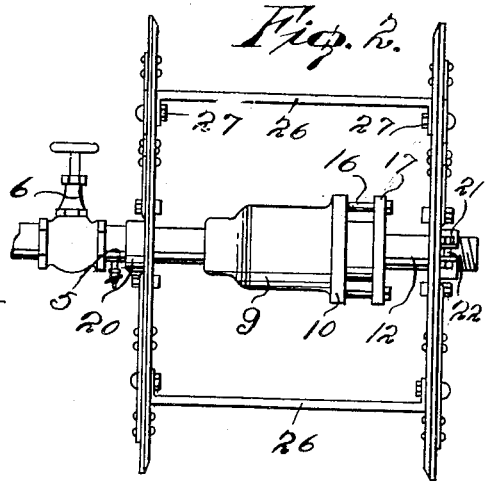
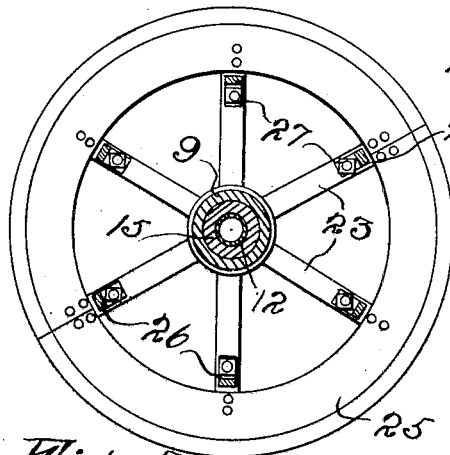
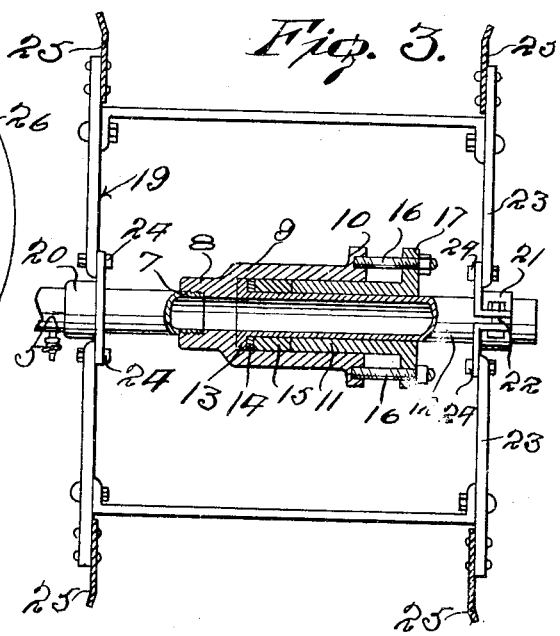
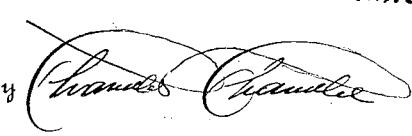

EDWARD M. HAMNER, OF DIBOLL, TEXAS.

HOSE-REEL.

1,350,499.  Specification of Letters Patent.  Patented Aug. 24, 1920.

Application filed June 26, 1917. Serial No. 177,109.

*To all whom it may concern:*

Be it known that I, EDWARD M. HAMNER, a citizen of the United States, residing at Diboll, in the county of Angelina, State of Texas, have invented certain new and useful Improvements in Hose-Reels; and I do hereby declare the following to be a full, clear, and exact description of the invention, such as will enable others skilled in the art to which it appertains to make and use the same.

This invention is an improvement in winding and unwinding apparatus and has particular reference to a hose reel.

An object of the invention is to provide a reel so constructed that the same may be revolubly mounted, in an improved manner, upon the water pipe in a building or other place whereby to supply water under pressure to the hose and also permit the same to be readily and quickly wound upon and unwound from said reel.

Another object is to provide a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is an end elevation of the reel constructed in accordance with the invention.

Fig. 2 is a side elevation thereof.

Fig. 3 is a vertical longitudinal section.

Fig. 4 is a transverse section.

In the drawing, the numeral 5 indicates a main water supply pipe usually projecting through the wall of a building at some convenient place so that in case of a fire the water supply will be readily accessible. The pipe 5 is provided with the usual shut-off valve 6 and is preferably screw threaded upon its outer end as indicated at 7 to receive the screw threaded end 8 of a swivel coupling or stuffing box 9 having an annular flange 10 at its opposite end. A cylindrical gland or bearing member 11 has one end mounted in the stuffing box 9 and receives therein the inner end of the rotatable water outlet pipe 12 provided upon its inner extremity with an annular flange 13 engaged by a packing ring 14 between which and the inner end of said gland is mounted a suitable packing 15 which will effectively prevent any leakage. The gland 11 is adjustable by means of screw fasteners 16 mounted in the flange 17 at the outer end thereof and engageable with the flange 10 of the stuffing box so that when the nuts 18 mounted upon said screw fasteners 17 are rotated the gland 11 will be forced inwardly and compress the packing 15.

The reel 19 is of open work construction so that the user may reach into its interior. It comprises an inner bearing or open hub 20 adapted to be slipped over and loosely mounted on the pipe 5, an outer hub 21 composed of clamping members adapted to be fastened around the pipe 12 by setting up bolts 22, two heads made up of radial spokes 23 bolted at their inner ends at 24 to the flanges of said hubs and radiating therefrom, two annular flanges 25 connecting the outer ends of the spokes of the respective heads, and a series of slats 26 connecting the spokes in pairs and attached to them by means of bolts 27. To apply this structure to a supply pipe the open hub 20 is slipped over said pipe and the threaded end 7 of the latter introduced into the threaded end 8 of the rotary element 9 of the coupling, which latter is then turned into threaded engagement with the pipe. A hose is now attached to the outer end of the outlet pipe 12, and when the valve 6 is opened the hose may be used. The valve 6 is then shut off, and the hose wound on the reel by rotating the latter, the pipe 12 turning with the outer hub while the inner hub 20 turns on the pipe 5. The reel and its hose are now supported wholly by the supply pipe, and when the hose is to be again used it is drawn from the reel to the extent needed, and the valve 6 manipulated as before. In the fall the entire device will be uncoupled and carried indoors.

What is claimed is:—

In a hose reel, the combination with an inner hub adapted to be slipped over and to rotate around a supply pipe, an outer hub comprising clamps and bolts connecting them, spokes radiating from the respective hubs, annular flanges connecting the outer ends of the two sets of spokes, and slats connecting the spokes in pairs; of an outlet pipe to whose outer end the hose is adapted to be attached, its body being held between said clamping members, and a swivel coupling mounted on its inner end and adapted for connection with the supply pipe at a point within the reel.

In testimony whereof, I affix my signature in the presence of two witnesses.

EDWARD M. HAMNER.

Witnesses:
P. H. STRAUSS,
O. H. WEISE.